(12) United States Patent
Fan et al.

(10) Patent No.: US 8,964,639 B2
(45) Date of Patent: Feb. 24, 2015

(54) UPLINK SEGMENTATION

(75) Inventors: Rui Fan, Beijing (CN); Rong Hu, Sollentuna (SE); Stefan Wager, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 946 days.

(21) Appl. No.: 13/130,646

(22) PCT Filed: Nov. 24, 2008

(86) PCT No.: PCT/SE2008/051337
§ 371 (c)(1),
(2), (4) Date: May 23, 2011

(87) PCT Pub. No.: WO2010/059087
PCT Pub. Date: May 27, 2010

(65) Prior Publication Data
US 2011/0223904 A1 Sep. 15, 2011

(51) Int. Cl.
*H04W 4/00* (2009.01)
*H04J 3/16* (2006.01)
*H04J 3/24* (2006.01)
*H04W 28/06* (2009.01)
*H04L 1/00* (2006.01)

(52) U.S. Cl.
CPC ........... *H04W 28/065* (2013.01); *H04L 1/0083* (2013.01)
USPC .............................. 370/328; 370/465; 370/474

(58) Field of Classification Search
None
See application file for complete search history.

(56) References Cited

U.S. PATENT DOCUMENTS

| 2006/0007952 | A1* | 1/2006 | Oishi et al. ................... 370/465 |
| 2006/0268938 | A1 | 11/2006 | Terry |
| 2007/0019553 | A1* | 1/2007 | Sagfors et al. ............... 370/236 |
| 2009/0103511 | A1* | 4/2009 | Marinier et al. ............. 370/345 |

OTHER PUBLICATIONS

3rd Generation Partnership Project. "ETFCS Configuration." 3GPP TSG RAN2#44, R2-042380, Shin Yocohama, Japan, Nov. 15-19, 2004.
3rd Generation Partnership Project. "RAB Configuration for VoIMS." 3GPP TSG RAN2#54bis, R2-050039, Sophia Antipolis, France, Jan. 10-14, 2005.

(Continued)

*Primary Examiner* — Hassan Phillips
*Assistant Examiner* — Saba Tsegaye
(74) *Attorney, Agent, or Firm* — Coats & Bennett, P.L.L.C.

(57) ABSTRACT

A device (110) receives a radio link control (RLC) protocol data unit (PDU) (740) or service data unit (SDU) (760) to be segmented, defines a padding threshold (840) for a segmentation mechanism, and determines a padding ratio (850) after enhanced dedicated channel transport format combination (ETFC) selection (730). The device selects a first transport block (960) and a second transport block (970) associated with the RLC PDU/SDU (740/760) when the padding ratio (850) is greater than or equal to the padding threshold (840), and generates a modified segmentation of the RLC PDU/SDU (740/760) based on the first and second transport blocks (960/970) when a padding ratio (RTB) associated with the first and second transport blocks (960/970) is less than the padding threshold (840) and a size ratio (STB) associated with the first and second transport blocks (960/970) is within a size threshold (980).

22 Claims, 15 Drawing Sheets

(56) References Cited

OTHER PUBLICATIONS

3rd Generation Partnership Project, "Technical Specification Group Radio Access Network; Radio Link Control (RLC) protocol specification (Release 8)," 3GPP TS 25.322 V8.1.0, Mar. 2008, pp. 1-89.

3rd Generation Partnership Project, "Technical Specification Group Radio Access Network; Medium Access Control (MAC) protocol specification (Release 8)," 3GPP TS 25.321 V8.1.0, Mar. 2008, pp. 1-157.

* cited by examiner

UPLINK SEGMENTATION

TECHNICAL FIELD

Embodiments described herein relate generally to wireless communication systems, and more particularly, to improved uplink segmentation in wireless communication systems.

BACKGROUND

Before the Third Generation Partnership Project (3GPP) Release 6, a radio link control (RLC) protocol data unit (PDU) was a fixed size (e.g., "336" or "656" bits). When a packet from a higher layer was larger than a RLC payload size, RLC needed to segment a service data unit (SDU) (e.g., into "320" or "640" bits) in order to fit a RLC PDU size. On the other hand, media access control (MAC) could perform concatenation, but not segmentation.

Such a small and fixed RLC PDU size was not efficient for large packets generated in the application layer, and prevented user equipment (UE) from obtaining higher user throughput. Thus, in 3GPP Release 7, the concept of a flexible RLC was introduced. Flexible RLC means that the RLC PDU size can be of any length below a predefined maximum RLC PDU size (e.g., "1500" bytes). With flexible RLC, the RLC PDU size can be much larger. In many cases a maximum supported transport block (TB) size at Layer 1 is unable to contain an entire RLC PDU. Therefore, MAC segmentation becomes necessary. Downlink segmentation at the MAC layer was introduced in 3GPP Release 7, and uplink segmentation at MAC layer was introduced in 3GPP Release 8. According to the current 3GPP specification, when segmentation is needed in an uplink, a final transport block size after enhanced dedicated channel (E-DCH) transport format combination (ETFC or E-TFC) selection (e.g., selection of an appropriate transport format for transmission of data on E-DCH) is determined to be a minimum of a maximum transport block size that is supported by current radio conditions and a size of the RLC PDU in the user equipment buffer (e.g., final_TB_size=min(maximum supported TB size, RLC PDU size)).

As an alternative to MAC segmentation, a new technique called radio-aware RLC segmentation has been defined for the uplink. This technique attempts to address the same problem (e.g., that the incoming RLC payload size be larger than a maximum transport block size after ETFC selection). However, it is the RLC layer, and not the MAC layer, that performs the segmentation. In radio-aware RLC segmentation, the final transport block size after ETFC selection is determined to be the minimum of the maximum transport block size that is supported by current radio conditions and a size of the RLC SDU in the user equipment buffer (e.g., final_TB_size=min (maximum supported TB size, RLC SDU size)).

Unfortunately, ETFC selection behavior during segmentation experiences problems regardless of whether MAC performs the segmentation or radio-aware RLC performs the segmentation. In some segmentation methods, the user equipment selects a transport block that can transmit as many bits as possible in a current transmission time interval (TTI) for a RLC PDU or a RLC SDU without considering how many bits are left in the RLC PDU or in the RLC SDU that need to be transmitted in a next TTI. These segmentation methods do not experience problems if a number of bits left in the RLC PDU or in the RLC SDU is large enough. However, such segmentation methods are not optimal if the number of bits left in the RLC PDU or in the RLC SDU is smaller than a minimum transport block size defined in an ETFC table.

For example, although a first transport block (e.g., transmitted in a first TTI) fits a first MAC PDU, a mismatch occurs between a second transport block (e.g., transmitted in a next TTI) and a second MAC PDU. Large padding (e.g., extra space) exists in the second transport block because a remaining portion of a RLC PDU or a RLC SDU is too small after segmentation. Although the remaining portion of the RLC PDU or the RLC SDU may wait in the buffer and concatenate with an incoming SDU at a later time, such an arrangement is not always acceptable for delay sensitive services (e.g., voice over Internet protocol (VoIP), etc.). Since an uplink resource is limited, too much padding is a waste of a valuable resource. Another drawback with such segmentation methods is that a difference between the two transport block sizes may be very large, which may result in a power jump (or power surge) in the user equipment.

SUMMARY

It is an object of the invention to overcome at least some of the above disadvantages, to minimize padding for a RLC PDU or SDU during segmentation and ETFC selection, and to make sizes of two segments of the RLC PDU or SDU similar in order to prevent wasting of power, interference generation, and/or power jump (e.g., in user equipment).

Embodiments described herein may apply a modified MAC segmentation mechanism and/or a modified radio-aware RLC segmentation mechanism that minimize padding for a RLC PDU or SDU during ETFC selection. In one embodiment, for example, user equipment may define a padding threshold (e.g., a threshold that may minimize padding in a RLC PDU or SDU) for a segmentation mechanism, may receive a higher layer RLC PDU or SDU to be segmented, and may receive, after ETFC selection, a padding ratio associated with consecutive TTIs. The user equipment may determine whether the padding ratio is greater than or equal to the padding threshold, and may iterate an ETFC table (e.g., stored in the user equipment) in order to select first and second transport blocks associated with the RLC PDU or SDU when the padding ratio is greater than or equal to the padding threshold. The user equipment may determine whether a padding ratio associated with the first and second transport blocks is less than the padding threshold, and may determine whether a size ratio associated with the first and second transport blocks is within a size threshold. The user equipment may generate a modified segmentation of the RLC PDU or SDU based on the first and second transport blocks when the padding ratio associated with the first and second transport blocks is less than the padding threshold and the size ratio associated with the first and second transport blocks is within the size threshold.

In an exemplary embodiment, the user equipment may select first and second transport blocks so that each includes half of the RLC PDU or SDU, with minimum padding, and may provide less padding in the size ratio associated with the selected first and second transport blocks. The user equipment may waste less power, may generate less interference, and may prevent a power jump (or power surge) based on the selected first and second transport blocks.

In another exemplary embodiment, the user equipment may use the first transport block in a first transmission time interval (TTI) associated with the RLC PDU or SDU, may use the second transport block in a second TTI associated with the RLC PDU or SDU, and may contain the entire RLC PDU or SDU within the first and second transport blocks.

In still another exemplary embodiment, the user equipment may minimize padding for the RLC PDU or SDU during ETFC selection, and may make sizes of the first and second transport blocks similar.

Such an arrangement may ensure that less padding is included in transport block sizes. This may prevent and/or reduce wasting of power and interference generation in the user equipment, and may improve performance of the user equipment. Furthermore, since such an arrangement may cause transport block sizes transmitted in two consecutive TTIs to be similar, power jump may be avoided in the user equipment.

DETAILED DESCRIPTION

The following detailed description refers to the accompanying drawings. The same reference numbers in different drawings may identify the same or similar elements. Also, the following detailed description does not limit the invention.

Embodiments described herein may apply a modified MAC segmentation mechanism and/or a modified radio-aware RLC segmentation mechanism that minimize padding for a RLC PDU or SDU during ETFC selection. The modified segmentation mechanisms described herein may ensure that less padding is included in transport block sizes, which may prevent and/or reduce wasting of power, interference generation, and/or power jump.

Figure 1:
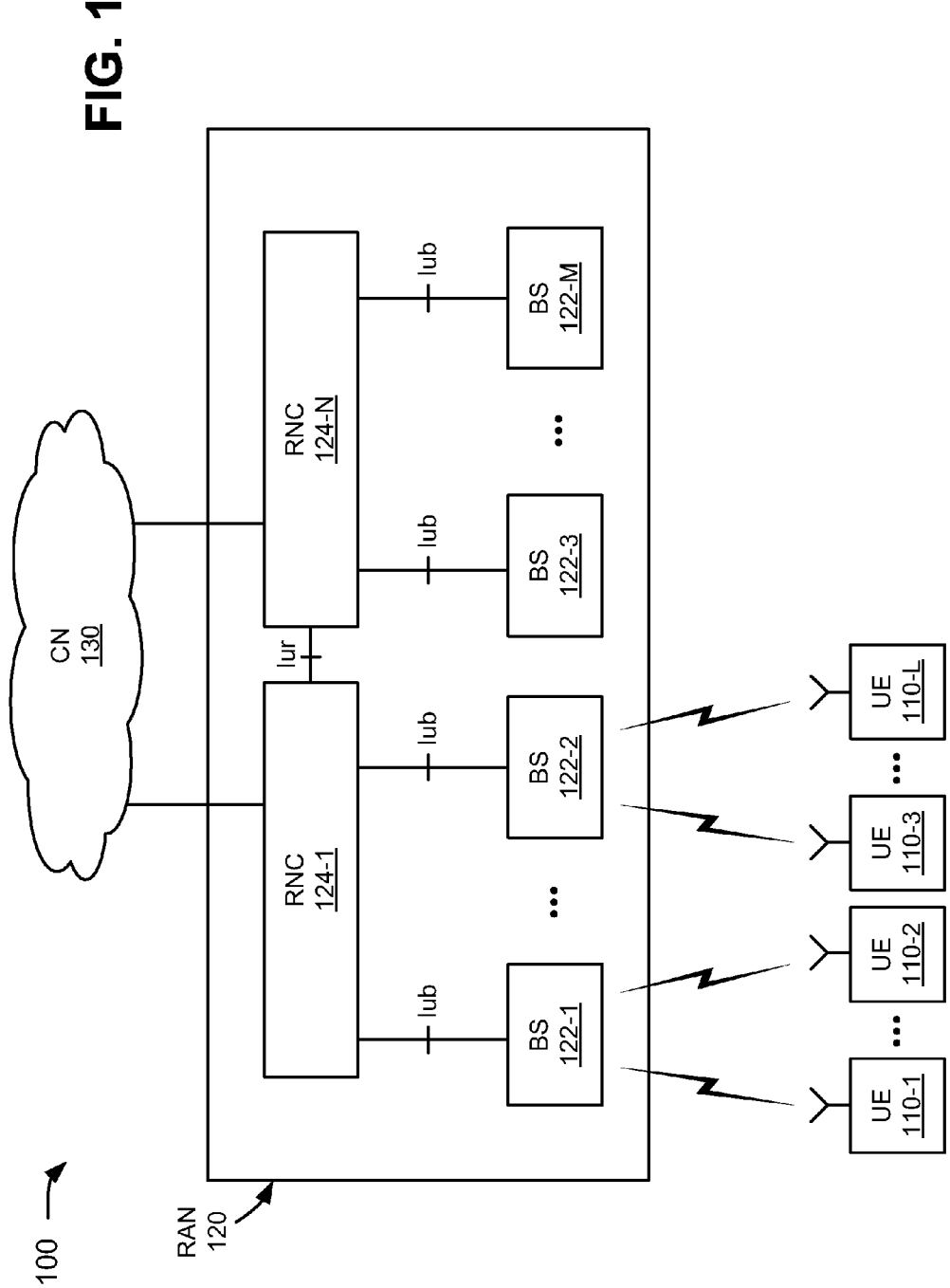
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively, and in some instances individually, as "user equipment 110"), a radio access network (RAN) 120, and a core network (CN) 130. Four pieces of user equipment 110, a single radio access network 120, and a single core network 130 have been illustrated in FIG. 1 for simplicity. In practice, there may be more UEs 110, random access networks 120, and/or core networks 130. Also, in some instances, a component in network 100 (e.g., one or more of user equipment 110, radio access network 120, and core network 130) may perform one or more functions described as being performed by another component or group of components in network 100.

User equipment 110 may include one or more devices capable of sending/receiving voice and/or data to/from radio access network 120. In one embodiment, user equipment 110 may include, for example, a wireless telephone, a personal digital assistant (PDA), a laptop computer, etc. In another embodiment, user equipment 110 may apply a modified MAC segmentation mechanism and/or a modified radio-aware RLC segmentation mechanism that minimize padding for a RLC PDU or SDU during ETFC selection.

Radio access network 120 may include one or more devices for transmitting voice and/or data to user equipment 110 and core network 130. As illustrated, radio access network 120 may include a group of base stations (BSs) 122-1 through 122-M (referred to collectively as "base stations 122" and in some instances, individually as "base station 122") and a group of radio network controllers (RNCs) 124-1 through 124-N (referred to collectively as "radio network controllers 124" and in some instances, individually as "radio network controller 124"). Four base stations 122 and two radio network controllers 124 are shown in FIG. 1 for simplicity. In practice, there may be more or fewer base stations 122 and/or radio network controllers 124. Also, in some instances, a component in radio access network 120 (e.g., one or more of base stations 122 and radio network controllers 124) may perform one or more functions described as being performed by another component or group of components in radio access network 120.

Base stations 122 (also referred to as "Node Bs") may include one or more devices that receive voice and/or data from radio network controllers 124 and transmit that voice and/or data to user equipment 110 via an air interface. Base stations 122 may also include one or more devices that receive voice and/or data from user equipment 110 over an air interface and transmit that voice and/or data to radio network controllers 124 or other user equipment 110.

Radio network controllers 124 may include one or more devices that control and manage base stations 122. Radio network controllers 124 may also include devices that perform data processing to manage utilization of radio network services. Radio network controllers 124 may transmit/receive voice and data to/from base stations 122, other radio network controllers 124, and/or core network 130.

A radio network controller 124 may act as a controlling radio network controller (CRNC), a drift radio network controller (DRNC), or a serving radio network controller (SRNC). A CRNC may be responsible for controlling the resources of a base station 122. On the other hand, an SRNC may serve particular user equipment 110 and may manage connections towards that user equipment 110. Likewise, a DRNC may fulfill a similar role to the SRNC (e.g., may route traffic between a SRNC and particular user equipment 110).

As illustrated in FIG. 1, a radio network controller 124 may connect to a base station 122 via an Iub interface and to another radio network controller 124 via an Iur interface.

Core network 130 may include one or more devices that transfer/receive voice and/or data to a circuit-switched and/or packet-switched network. In one embodiment, core network 130 may include, for example, a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

Figure 2:
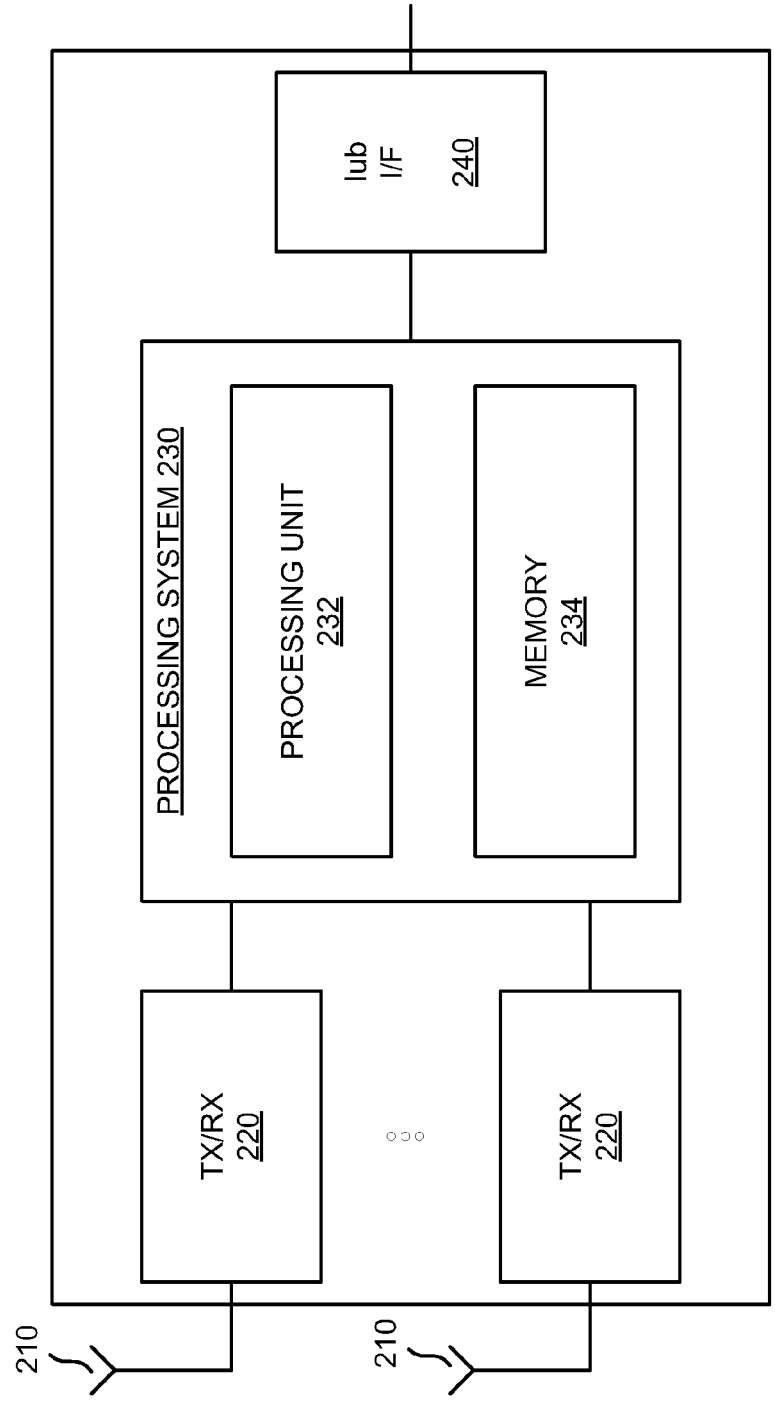
FIG. 2 illustrates a diagram of exemplary components of a base station depicted FIG. 1.

FIG. 2 illustrates a diagram of exemplary components of base station 122. As shown in FIG. 2, base station 122 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 110, via antennas 210.

Processing system 230 may control the operation of base station 122. Processing system 230 may also process information received via transceivers 220 and Iub interface 240. Processing system 230 may further measure quality and strength of connection, may determine the frame error rate (FER), and may transmit this information to radio network controller 124. As illustrated, processing system 230 may include a processing unit 232 and a memory 234.

Processing unit 232 may include a processor, a microprocessor, an application specific integrated circuit (ASIC), a field programmable gate array (FPGA), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may generate control messages and/or data messages, and may cause those control messages and/or data messages to be transmitted via transceivers 220 and/or Iub interface 240. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232.

Iub interface 240 may include one or more line cards that allow base station 122 to transmit data to and receive data from radio network controller 124.

As described herein, base station 122 may perform certain operations in response to processing unit 232 executing software instructions of an application contained in a computer-readable medium, such as memory 234. A computer-readable medium may be defined as a physical or logical memory device. The software instructions may be read into memory 234 from another computer-readable medium or from another device via antennas 210 and transceivers 220. The software instructions contained in memory may cause processing unit 232 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 122, in other embodiments, base station 122 may contain fewer, different, or additional components than depicted in FIG. 2. In still other embodiments, one or more components of base station 122 may perform one or more other tasks described as being performed by one or more other components of base station 122.

Figure 3:
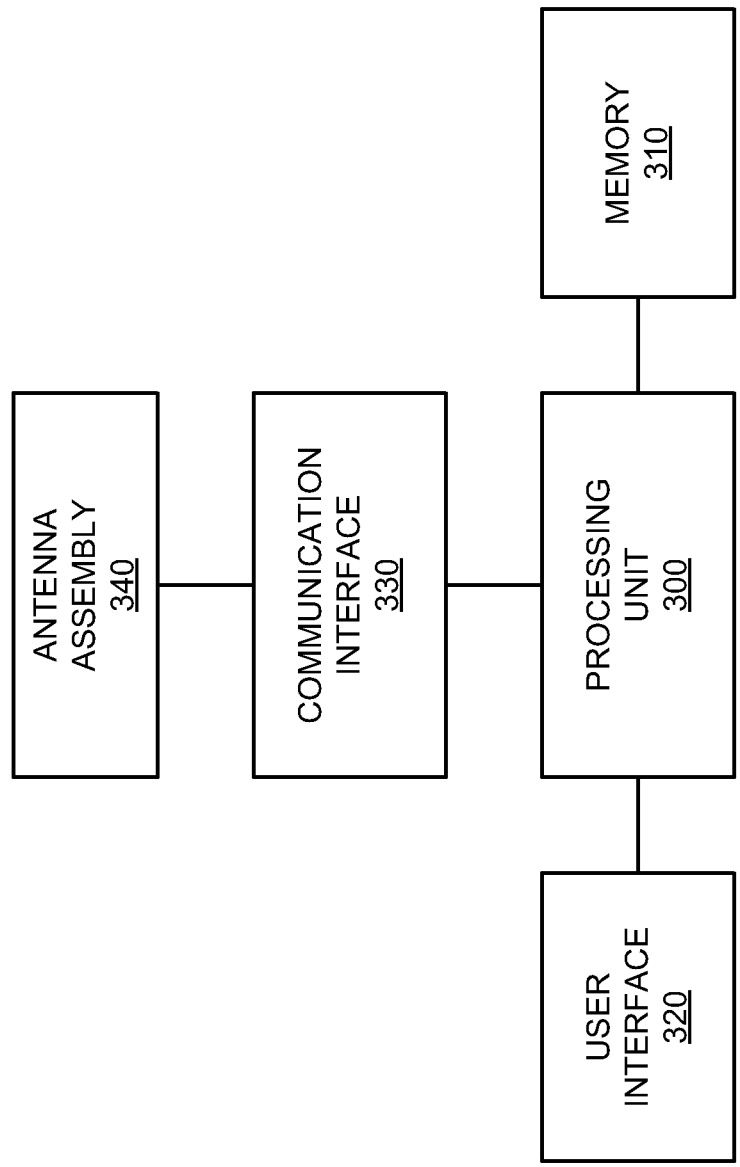
FIG. 3 depicts a diagram of exemplary components of user equipment illustrated in FIG. 1.

FIG. 3 depicts a diagram of exemplary components of user equipment 110. As shown in FIG. 3, user equipment 110 may include a processing unit 300, a memory 310, a user interface 320, a communication interface 330, and/or an antenna assembly 340.

Processing unit 300 may include a processor, a microprocessor, an ASIC, a FPGA, or the like. Processing unit 300 may control operation of user equipment 110 and its components. In one embodiment, processing unit 300 may control operation of components of user equipment 110 in a manner described herein.

Memory 310 may include a RAM, a ROM, and/or another type of memory to store data and instructions that may be used by processing unit 300.

User interface 320 may include mechanisms for inputting information to user equipment 110 and/or for outputting information from user equipment 110.

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive signals through a radio interface. Antenna assembly 340 may, for example, receive RF signals from communication interface 330 and transmit them through the radio interface, and receive RF signals through the radio interface and provide them to communication interface 330. In one embodiment, for example, communication interface 330 may communicate with a network (e.g., network 100) and/or devices connected to a network.

As described herein, user equipment 110 may perform certain operations in response to processing unit 300 executing software instructions of an application contained in a computer-readable medium, such as memory 310. The software instructions may be read into memory 310 from another computer-readable medium or from another device via communication interface 330. The software instructions contained in memory 310 may cause processing unit 300 to perform processes described herein. Alternatively, hardwired circuitry may be used in place of or in combination with software instructions to implement processes described herein. Thus, embodiments described herein are not limited to any specific combination of hardware circuitry and software.

Although FIG. 3 shows exemplary components of user equipment 110, in other embodiments, user equipment 110 may contain fewer, different, or additional components than depicted in FIG. 3. In still other embodiments, one or more components of user equipment 110 may perform one or more other tasks described as being performed by one or more other components of user equipment 110.

Figure 4:
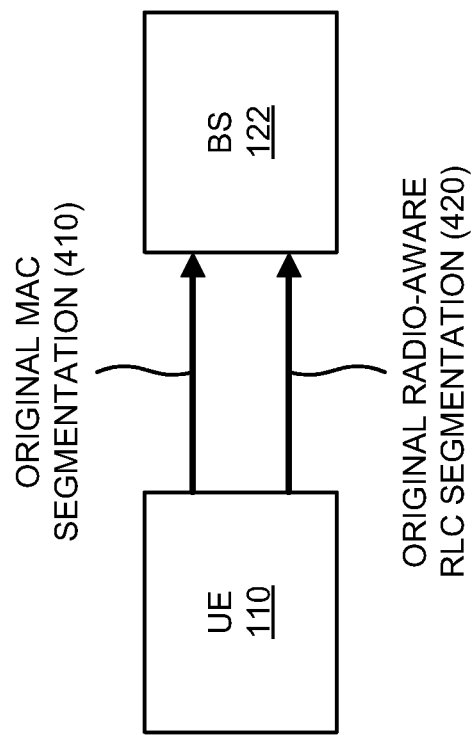
FIG. 4 depicts a diagram of exemplary interactions among the user equipment and the base station illustrated in FIG. 1.

FIG. 4 depicts a diagram of exemplary interactions among user equipment 110 and base station 122. User equipment 110 and base station 122 may include the features described above in connection with, for example, FIGS. 1-3.

As shown in FIG. 4, user equipment 110 may utilize an original MAC segmentation mechanism 410 to segment transfer blocks that may be transmitted to base station 122 via an uplink. Original MAC segmentation mechanism 410 may permit user equipment 110 to select a transport block that can transmit as many bits as possible in a current transmission time interval (TTI) for a RLC PDU without considering how many bits are left in the RLC PDU that need to be transmitted in a next TTI. Original MAC segmentation mechanism 410 may perform the segmentation of transport blocks at the MAC layer.

As further shown in FIG. 4, user equipment 110 may utilize an original radio-aware RLC segmentation mechanism 420 to segment transmit transfer blocks that may be transmitted to base station 122 via an uplink. Original radio-aware RLC segmentation mechanism 420 may permit user equipment 110 to select a transport block that can transmit as many bits as possible in a current transmission time interval (TTI) for a RLC SDU without considering how many bits are left in the RLC SDU that need to be transmitted in a next TTI. Original radio-aware RLC segmentation mechanism 420 may perform the segmentation of transport blocks at the RLC layer.

In one exemplary embodiment, user equipment 110 may define a padding threshold ($R_{THRESHOLD}$) for original MAC segmentation mechanism 410. If a higher layer RLC PDU needs to be segmented, user equipment 110 may determine whether a padding ratio (R) associated with consecutive TTIs is greater than the padding threshold. If the padding ratio is less than the padding threshold (e.g., $R<R_{THRESHOLD}$), user equipment 110 may deploy original MAC segmentation mechanism 410. Otherwise, user equipment 110 may deploy a modified MAC segmentation mechanism, described below.

In one exemplary embodiment, user equipment 110 may define a padding threshold ($R_{THRESHOLD}$) for original radio-aware RLC segmentation mechanism 420. If a higher layer RLC SDU needs to be segmented, user equipment 110 may determine whether a padding ratio (R) associated with consecutive TTIs is greater than the padding threshold. If the padding ratio is less than the padding threshold (e.g., $R<R_{THRESHOLD}$), user equipment 110 may deploy original radio-aware RLC segmentation mechanism 420. Otherwise, user equipment 110 may deploy a modified radio-aware RLC segmentation mechanism, described below.

Although FIG. 4 shows exemplary interactions between user equipment 110 and base station 122, in other embodiments, user equipment 110 and base station 122 may perform fewer, different, or additional interactions than depicted in FIG. 4.

Figure 5:
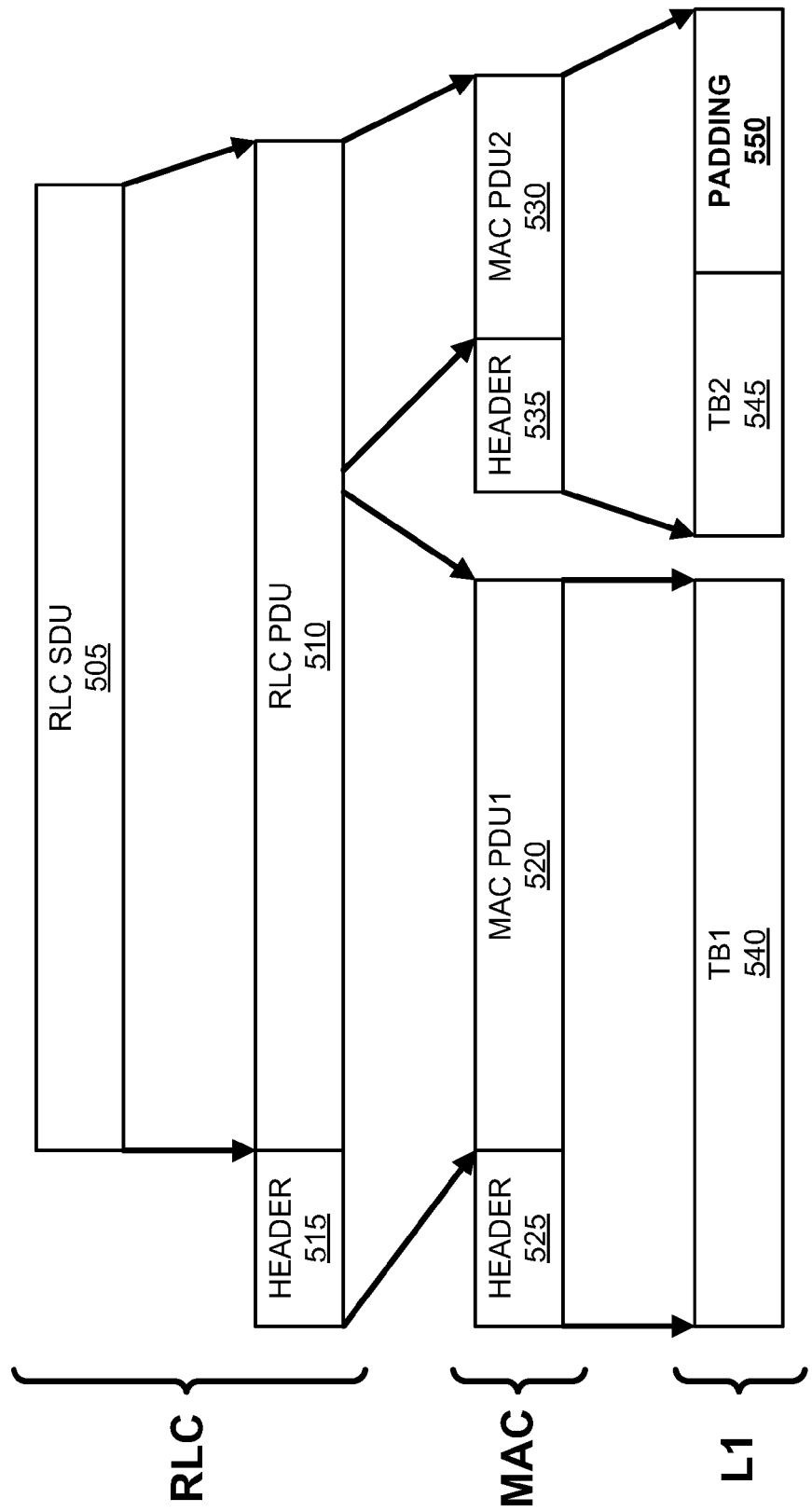
FIG. 5 illustrates a diagram of an exemplary original media access control (MAC) segmentation mechanism capable of being deployed by the user equipment depicted in FIG. 1.

FIG. 5 illustrates a diagram of an exemplary original MAC segmentation mechanism 500 (e.g., original MAC segmentation mechanism 410) capable of being deployed by user equipment 110. As shown, the RLC layer may include a RLC SDU 505 and a RLC PDU 510 (and a corresponding header 515). RLC SDU 505 may include a set of data that a certain layer (e.g., the RLC layer) may pass to a layer below (e.g., the MAC layer). In one example, RLC SDU 505 may be considered a "payload" of RLC PDU 510. RLC PDU 510 may include data that may be sent to a peer protocol layer (e.g., the MAC layer).

As further shown in FIG. 5, at the MAC layer, original MAC segmentation mechanism 500 may segment RLC PDU 510 into a MAC PDU1 520 (and a corresponding header 525) and a MAC PDU2 530 (and a corresponding header 535). In one embodiment, MAC PDU1 520 may be associated with a current transmission time interval (TTI) and MAC PDU2 530 may be associated with a next TTI. At Layer 1 (L1), original MAC segmentation mechanism 500 may associate MAC PDU1 520 and its header 525 with a first transport block (TB1) 540, and may associate MAC PDU2 530 and its header 535 with a second transport block (TB2) 545. Original MAC segmentation mechanism 500 may permit user equipment 110 to select TB1 540 so that TB1 540 can transmit as many bits as possible in the current TTI for MAC PDU1 520 without considering how many bits are left in MAC PDU2 530 that need to be transmitted in the next TTI.

TB1 540 may fit MAC PDU1 520, but a mismatch may occur between TB2 545 and MAC PDU2 530. Padding 550 (e.g., extra space) may exist in TB2 545 because a remaining portion of RLC PDU 510 (e.g., contained in TB2 545) may be too small after segmentation. The remaining portion of the RLC PDU 510 may wait in a buffer and concatenate with an incoming SDU at a later time.

Although FIG. 5 shows exemplary tasks associated with original MAC segmentation mechanism 500, in other embodiments, original MAC segmentation mechanism 500 may perform fewer, different, or additional tasks than depicted in FIG. 5.

Figure 6:
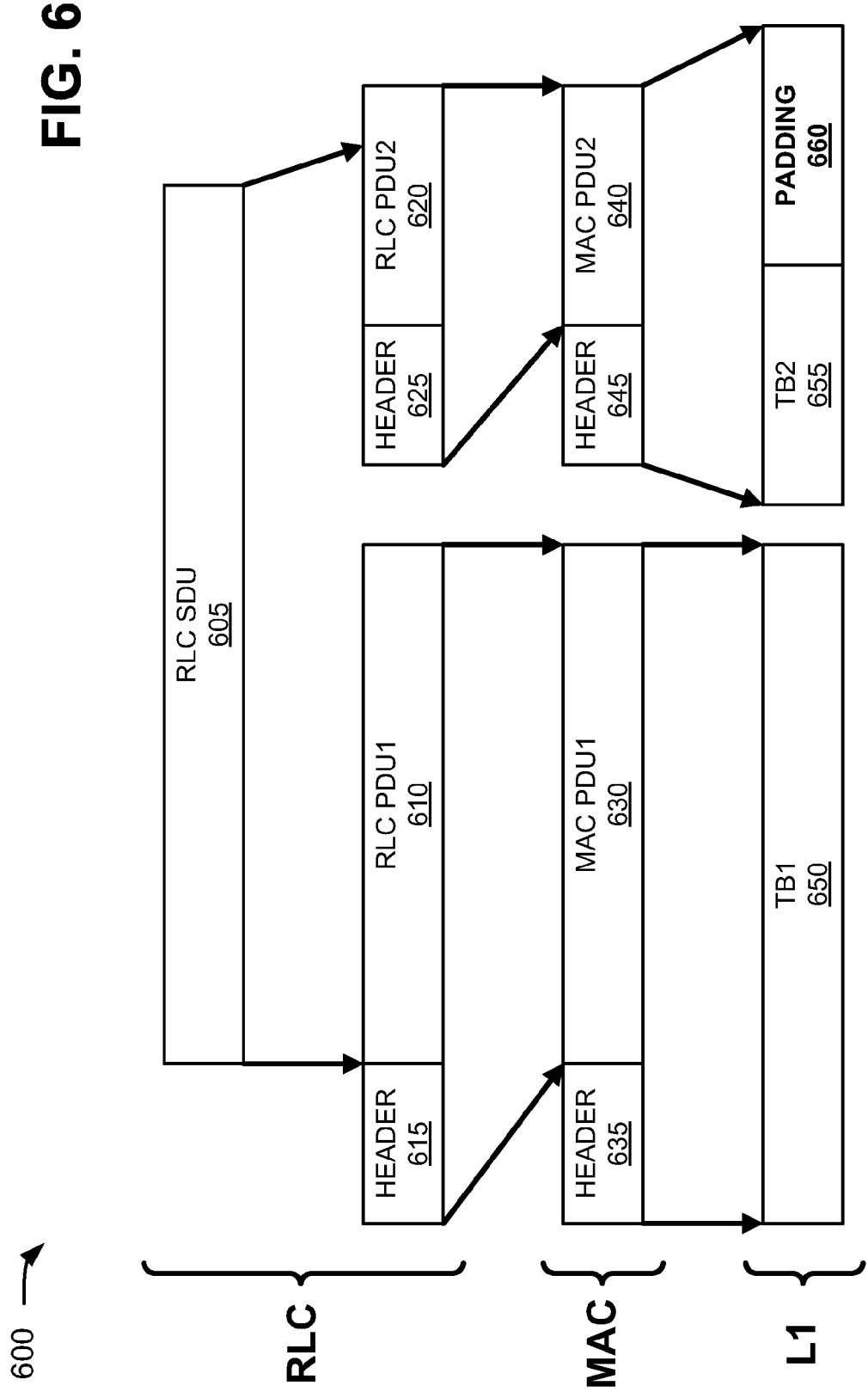
FIG. 6 depicts a diagram of an exemplary original radio-aware radio link control (RLC) segmentation mechanism capable of being deployed by the user equipment illustrated in FIG. 1.

FIG. 6 depicts a diagram of an exemplary original radio-aware radio link control (RLC) segmentation mechanism 600 (e.g., original radio-aware RLC segmentation mechanism 420) capable of being deployed by user equipment 110. As shown, the RLC layer may include a RLC SDU 605. At the RLC layer, original radio-aware RLC segmentation mechanism 600 may segment RLC SDU 605 into a RLC PDU1 610 (and a corresponding header 615) and a RLC PDU2 620 (and a corresponding header 625). RLC SDU 605 may include a set of data that a certain layer (e.g., the RLC layer) may pass to a layer below (e.g., the MAC layer). In one example, RLC SDU 605 may be considered a "payload" of RLC PDU1 610 and RLC PDU2 620. RLC PDU1 610 and RLC PDU2 620 may include data that may be sent to a peer protocol layer (e.g., the MAC layer).

At the MAC layer, original radio-aware RLC segmentation mechanism 600 may associate RLC PDU1 610 and its header 615 with a MAC PDU1 630 (and a corresponding header 635), and may associate RLC PDU2 620 and its header 625 with a MAC PDU2 640 (and a corresponding header 645). In one embodiment, MAC PDU1 630 may be associated with a current transmission time interval (TTI) and MAC PDU2 640 may be associated with a next TTI. At Layer 1 (L1), original radio-aware RLC segmentation mechanism 600 may associate MAC PDU1 630 and its header 635 with a first transport block (TB1) 650, and may associate MAC PDU2 640 and its header 645 with a second transport block (TB2) 655. Original radio-aware RLC segmentation mechanism 600 may permit user equipment 110 to select TB1 650 so that TB1 650 can transmit as many bits as possible in the current TTI for MAC PDU1 630 without considering how many bits are left in MAC PDU2 640 that need to be transmitted in the next TTI.

TB1 650 may fit MAC PDU1 630, but a mismatch may occur between TB2 655 and MAC PDU2 640. Padding 660 (e.g., extra space) may exist in TB2 655 because a remaining portion of RLC SDU 605 (e.g., contained in TB2 655) may be too small after segmentation. The remaining portion of the RLC SDU 605 may wait in a buffer and concatenate with an incoming SDU at a later time.

Although FIG. 6 shows exemplary tasks associated with original radio-aware RLC segmentation mechanism 600, in other embodiments, original radio-aware RLC segmentation mechanism 600 may perform fewer, different, or additional tasks than depicted in FIG. 6.

Figure 7:
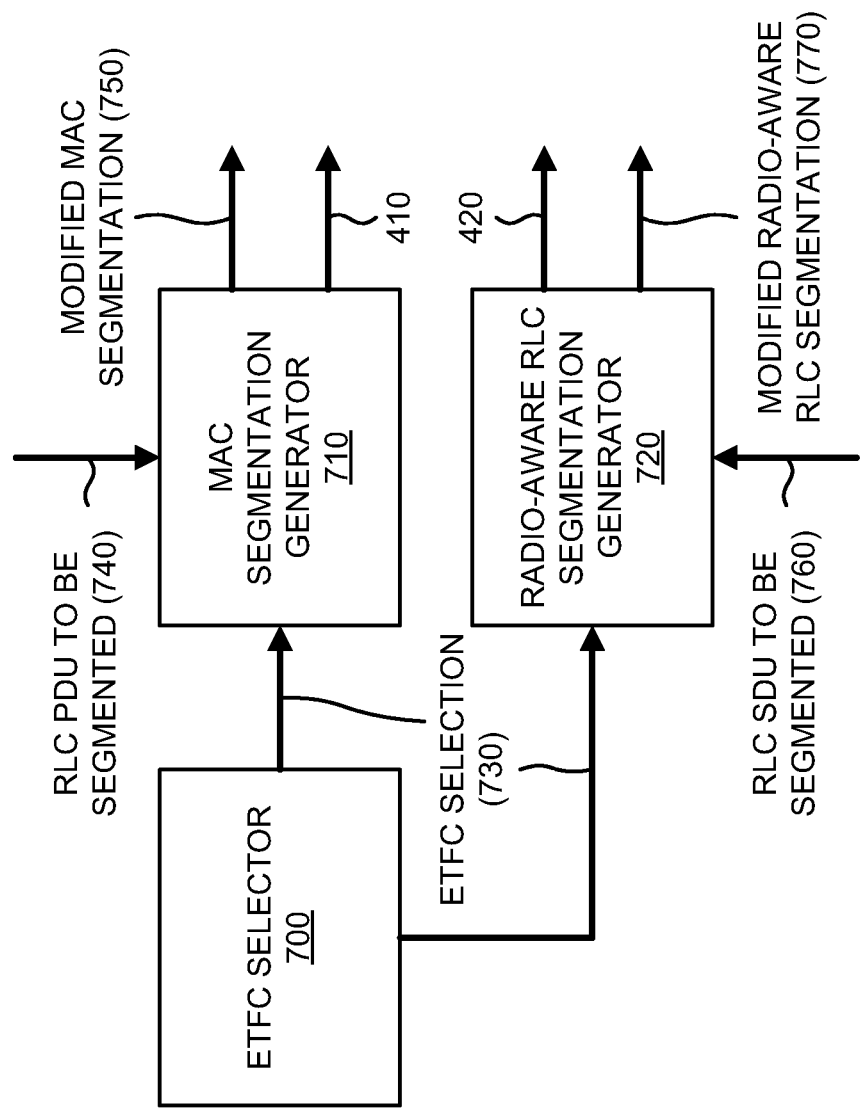
FIG. 7 illustrates a diagram of exemplary functional components of the user equipment depicted in FIG. 1.

FIG. 7 illustrates a diagram of exemplary functional components of user equipment 110. As shown, user equipment 110 may include an ETFC selector 700, a MAC segmentation generator 710, and a radio-aware RLC segmentation generator 720. In one embodiment, the functions described in connection with FIG. 7 may be performed by processing unit 300 (FIG. 3).

ETFC selector 700 may include any hardware, software, or combination of hardware and software that may select an appropriate transport format for transmission of data on an enhanced dedicated channel (E-DCH) associated with user equipment 110. In one embodiment, ETFC selector 700 may select an E-DCH transport format combination (ETFC or E-TFC), as indicated by reference number 730, for transmission of data on the E-DCH. ETFC selector 700 may provide ETFC selection 730 to MAC segmentation generator 710 and radio-aware RLC segmentation generator 720.

MAC segmentation generator 710 may include any hardware, software, or combination of hardware and software that may receive ETFC selection 730 from ETFC selector 700, and may receive a RLC PDU 740 to be segmented. In one embodiment, MAC segmentation generator 710 may define a padding threshold ($R_{THRESHOLD}$). If RLC PDU 740 needs to be segmented, MAC segmentation generator 710 may determine whether a padding ratio (R) associated with consecutive TTIs is greater than the padding threshold. If the padding ratio is less than the padding threshold (e.g., $R<R_{THRESHOLD}$), MAC segmentation generator 710 may deploy original MAC segmentation mechanism 410. If the padding ratio is greater than or equal to the padding threshold (e.g., $R \geq R_{THRESHOLD}$), MAC segmentation generator 710 may deploy a modified MAC segmentation mechanism 750.

Radio-aware RLC segmentation generator 720 may include any hardware, software, or combination of hardware and software that may receive ETFC selection 730 from ETFC selector 700, and may receive a RLC SDU 760 to be segmented. In one embodiment, radio-aware RLC segmentation generator 720 may define a padding threshold ($R_{THRESHOLD}$). If RLC SDU 760 needs to be segmented, radio-aware RLC segmentation generator 720 may determine whether a padding ratio (R) associated with consecutive TTIs is greater than the padding threshold. If the padding ratio is less than the padding threshold (e.g., $R<R_{THRESHOLD}$), radio-aware RLC segmentation generator 720 may deploy original radio-aware RLC segmentation mechanism 420. If the padding ratio is greater than or equal to the padding threshold (e.g., $R \geq R_{THRESHOLD}$), radio-aware RLC segmentation generator 720 may deploy a modified radio-aware RLC segmentation mechanism 770.

Although FIG. 7 shows exemplary functional components of user equipment 110, in other embodiments, user equipment 110 may contain fewer, different, or additional functional components than depicted in FIG. 7. In still other embodiments, one or more functional components of user equipment 110 may perform one or more other tasks described as being performed by one or more other functional components of user equipment 110.

Figure 8:
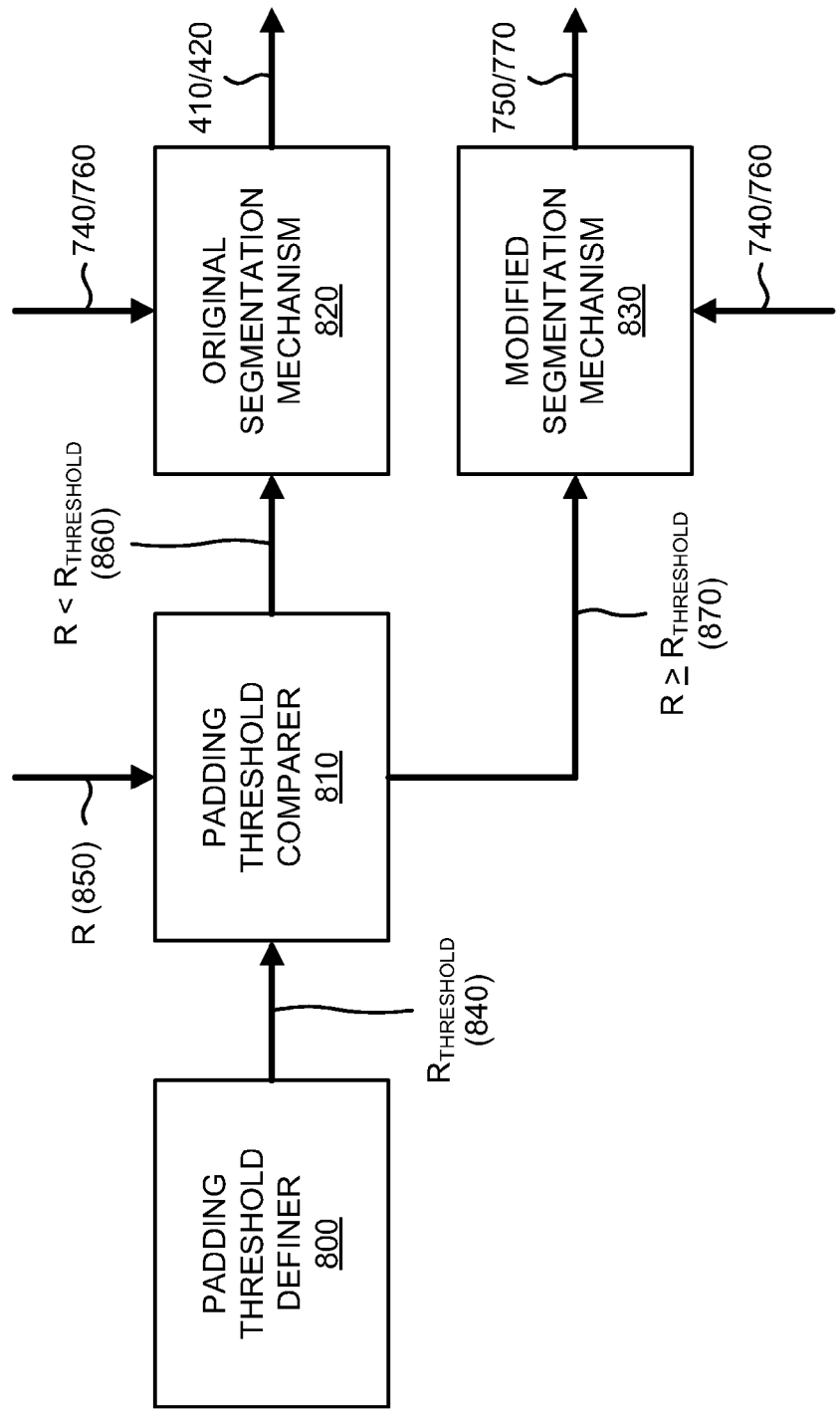
FIG. 8 depicts a diagram of exemplary functional components of a MAC segmentation generator and/or a radio-aware RLC segmentation generator illustrated in FIG. 7.

FIG. 8 depicts a diagram of exemplary functional components of MAC segmentation generator 710 and/or a radio-aware RLC segmentation generator 720. As shown, MAC segmentation generator 710 and/or a radio-aware RLC segmentation generator 720 may include a padding threshold definer 800, a padding threshold comparer 810, an original segmentation mechanism 820, and a modified segmentation mechanism 830. In one embodiment, the functions described in connection with FIG. 8 may be performed by processing unit 300 (FIG. 3).

Padding threshold definer 800 may include any hardware, software, or combination of hardware and software that may define a padding threshold ($R_{THRESHOLD}$) 840 for the MAC segmentation mechanisms (e.g., original MAC segmentation mechanism 410 and/or modified MAC segmentation mechanism 750) and/or the radio-aware RLC segmentation mechanisms (e.g., original radio-aware RLC segmentation mechanism 420 and/or modified radio-aware RLC segmentation mechanism 770). Padding threshold definer 800 may provide padding threshold 840 to padding threshold comparer 810.

Padding threshold comparer 810 may include any hardware, software, or combination of hardware and software that may receive padding threshold 840 from padding threshold definer 800, may receive a padding ratio (R) 850 associated with consecutive TTIs, and may compare padding ratio 850 and padding threshold 840. In one embodiment, if padding threshold comparer 810 makes a determination 860 that padding ratio 850 is less than padding threshold 840 (e.g., $R<R_{THRESHOLD}$), padding threshold comparer 810 may provide determination 860 to original segmentation mechanism 820. In another embodiment, if padding threshold comparer 810 makes a determination 870 that padding ratio 850 is greater than or equal to padding threshold 840 (e.g., $R \geq R_{THRESHOLD}$), padding threshold comparer 810 may provide determination 870 to original segmentation mechanism 830.

Original segmentation mechanism 820 may include any hardware, software, or combination of hardware and software that may receive determination 860 from padding threshold comparer 810, and may receive RLC PDU 740 or RLC SDU 760. Original segmentation mechanism 820 may deploy a certain original segmentation mechanism (e.g., original MAC segmentation mechanism 410 or original radio-aware RLC segmentation mechanism 420) based on whether RLC PDU 740 or RLC SDU 760 is received. For example, in one embodiment, original segmentation mechanism 820 may deploy original MAC segmentation mechanism 410 if RLC PDU 740 is received. In another embodiment, original segmentation mechanism 820 may deploy original radio-aware RLC segmentation mechanism 420 if RLC SDU 760 is received.

Modified segmentation mechanism 830 may include any hardware, software, or combination of hardware and software that may receive determination 870 from padding threshold comparer 810, and may receive RLC PDU 740 or RLC SDU 760. Modified segmentation mechanism 830 may deploy a certain modified segmentation mechanism (e.g., modified MAC segmentation mechanism 750 or modified radio-aware RLC segmentation mechanism 770) based on whether RLC PDU 740 or RLC SDU 760 is received. For example, in one embodiment, modified segmentation mechanism 830 may deploy modified MAC segmentation mechanism 750 if RLC PDU 740 is received. In another embodiment, modified segmentation mechanism 770 may deploy modified radio-aware RLC segmentation mechanism 770 if RLC SDU 760 is received.

Although FIG. 8 shows exemplary functional components of MAC segmentation generator 710 and/or a radio-aware RLC segmentation generator 720, in other embodiments, MAC segmentation generator 710 and/or a radio-aware RLC segmentation generator 720 may contain fewer, different, or additional functional components than depicted in FIG. 8. In still other embodiments, one or more functional components of MAC segmentation generator 710 and/or a radio-aware RLC segmentation generator 720 may perform one or more other tasks described as being performed by one or more other functional components of MAC segmentation generator 710 and/or a radio-aware RLC segmentation generator 720.

Figure 9:
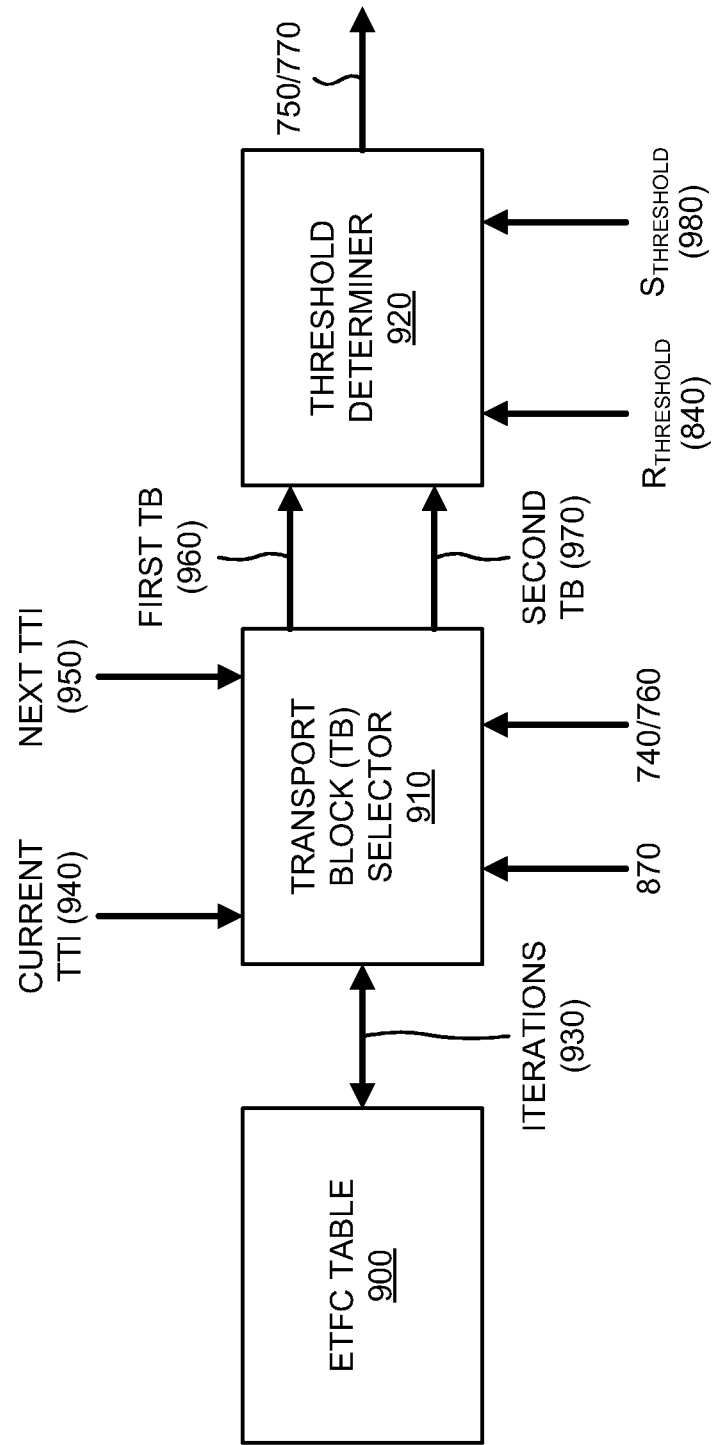
FIG. 9 illustrates a diagram of exemplary functional components of a modified segmentation mechanism depicted in FIG. 8.

FIG. 9 illustrates a diagram of exemplary functional components of modified segmentation mechanism 830. As shown, modified segmentation mechanism 830 may include an ETFC table 900, a transport block selector 910, and a threshold determiner 920. In one embodiment, the functions described in connection with FIG. 8 may be performed by processing unit 300 (FIG. 3).

ETFC table 900 may include a table of one or more entries that provide appropriate transport formats for transmission of data on E-DCH. In one embodiment, ETFC table 900 may include one or more transport blocks associated with corresponding transmission time intervals TTIs. ETFC table 900 may also include multiple tables. For example, ETFC table 900 may include four tables (e.g., two tables for a two milliseconds TTI and two tables for a ten milliseconds TTI).

Transport block selector 910 may include any hardware, software, or combination of hardware and software that may receive determination 870, and perform iterations 930 with ETFC table 900 if determination 870 is received. Transport block selector 910 may receive RLC PDU 740 or RLC SDU 760, and may receive a current TTI 940 and a next TTI 950 based on iterations 930. Current TTI 940 and next TTI may be associated with RLC PDU 740 or RLC SDU 760. Transport block selector 910 may select two transport blocks (e.g., a first transport block (TB) 960 and a second transport block (TB) 970) that may contain RLC PDU 740 or RLC SDU 760 based on the received information. In one exemplary embodiment, transport block selector 910 may select first transport block 960 for use in current TTI 940, and may select second transport block 970 for use in next TTI 950. Transport block selector 910 may provide first transport block 960 and second transport block 970 to threshold determiner 920.

Threshold determiner 920 may include any hardware, software, or combination of hardware and software that may receive first transport block 960 and second transport block 970 from transport block selector 910, and may receive padding threshold 840 and a size threshold ($S_{THRESHOLD}$) 980. In order for first transport block 960 and second transport block 970 to contain RLC PDU 740 or RLC SDU 760 (e.g., with minimal to no padding), threshold determiner 920 may determine if a padding ratio ($R_{TB}$) associated with first and second transport blocks 960/970 is less than padding threshold 840, and may determine if a size ratio ($S_{TB}$) between first transport block 960 and second transport block 970 is within size threshold 980. If the padding ratio ($R_{TB}$) is less than padding threshold 840 and the size ratio ($S_{TB}$) is within size threshold 980, threshold determiner 920 may deploy a certain modified segmentation mechanism (e.g., modified MAC segmentation mechanism 750 or modified radio-aware RLC segmentation mechanism 770) based on whether RLC PDU 740 or RLC SDU 760 is received. For example, in one embodiment, threshold determiner 920 may deploy modified MAC segmentation mechanism 750 if RLC PDU 740 is received. In another embodiment, threshold determiner 920 may deploy modified radio-aware RLC segmentation mechanism 770 if RLC SDU 760 is received.

In one exemplary embodiment, modified segmentation mechanism 830 (e.g., via transport block selector 910) may select a transport block (e.g., first transport block 960) that is sized to contain half of RLC PDU 740 (or RLC SDU 760), and may select another transport block (e.g., second transport block 970) that is sized to contain the other half of RLC PDU 740 (or RLC SDU 760). Modified segmentation mechanism 830 may also provide less padding in sizes associated with first transport block 960 and second transport block 970. Such an arrangement may ensure that padding is minimized and/or eliminated for RLC PDU 740 (or RLC SDU 760) during ETFC selection, and may provide a simple way to select transport blocks from ETFC table 900. Modified MAC segmentation mechanism 750 and modified radio-aware RLC segmentation mechanism 770 may prevent and/or reduce wasting of power, interference generation, and power jump in user equipment 110. Further details of modified MAC segmentation mechanism 750 and modified radio-aware RLC segmentation mechanism 770 are provided below in connection with FIGS. 10 and 11, respectively.

Although FIG. 9 shows exemplary functional components of modified segmentation mechanism 830, in other embodiments, modified segmentation mechanism 830 may contain fewer, different, or additional functional components than depicted in FIG. 9. In still other embodiments, one or more functional components of modified segmentation mechanism 830 may perform one or more other tasks described as being performed by one or more other functional components of modified segmentation mechanism 830.

Figure 10:
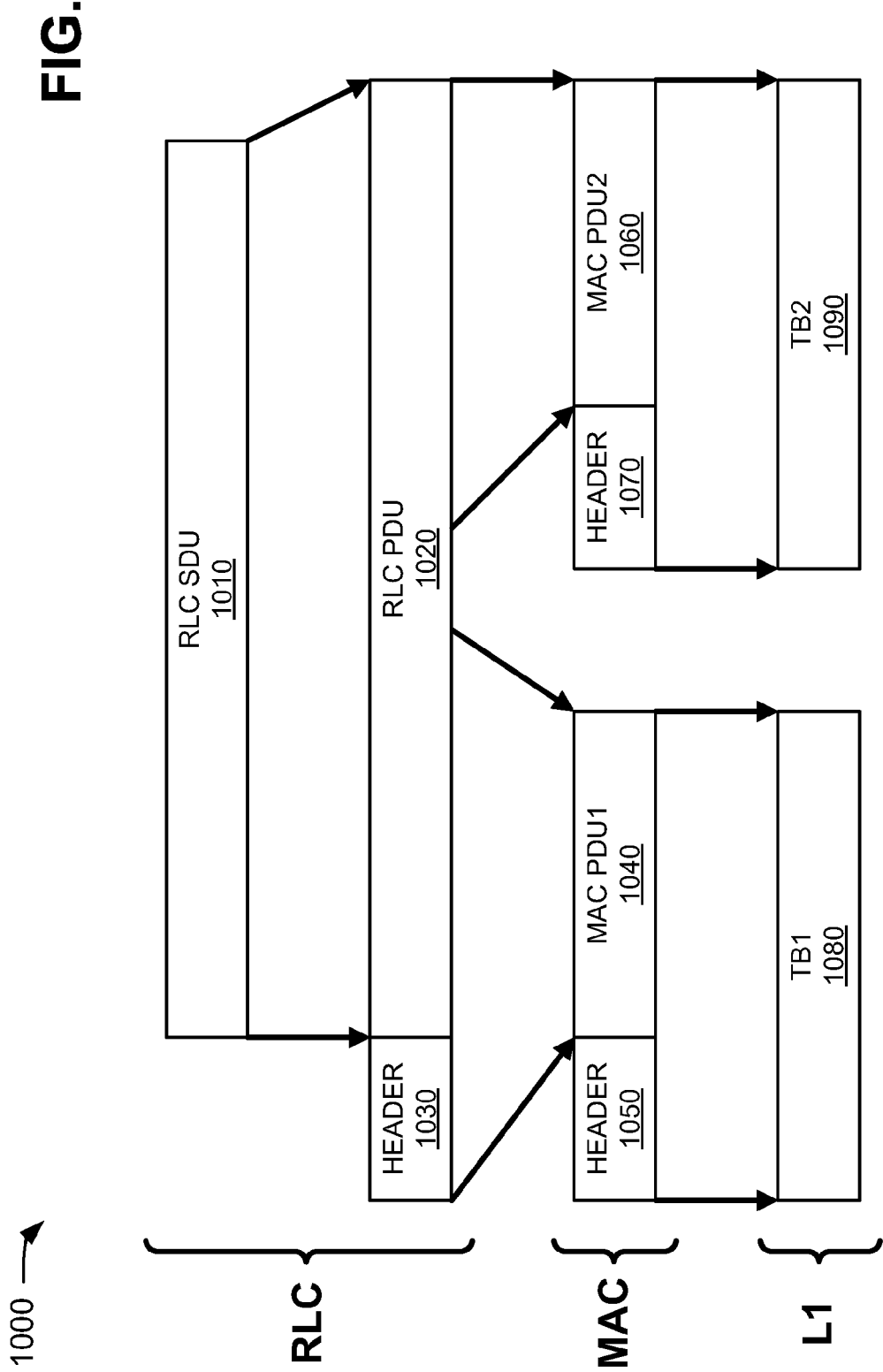
FIG. 10 depicts a diagram of an exemplary modified MAC segmentation mechanism capable of being deployed by the user equipment illustrated in FIG. 1.

FIG. 10 depicts a diagram of an exemplary modified MAC segmentation mechanism 1000 (e.g., modified MAC segmentation mechanism 750) capable of being deployed by user equipment 110. As shown, the RLC layer may include a RLC SDU 1010 and a RLC PDU 1020 (and a corresponding header 1030). RLC SDU 1010 may include a set of data that a certain layer (e.g., the RLC layer) may pass to a layer below (e.g., the MAC layer). In one example, RLC SDU 1010 may be considered a "payload" of RLC PDU 1020. RLC PDU 1020 may include data that may be sent to a peer protocol layer (e.g., the MAC layer).

As further shown in FIG. 10, at the MAC layer, modified MAC segmentation mechanism 1000 may segment RLC PDU 1020 into a MAC PDU1 1040 (and a corresponding header 1050) and a MAC PDU2 1060 (and a corresponding header 1070). In one embodiment, MAC PDU1 1040 may be associated with a current transmission time interval (TTI) and MAC PDU2 1060 may be associated with a next TTI. At Layer 1 (L1), modified MAC segmentation mechanism 1000 may associate MAC PDU1 1040 and its header 1050 with a first transport block (TB1) 1080, and may associate MAC PDU2 1060 and its header 1070 with a second transport block (TB2) 1090. Modified MAC segmentation mechanism 1000 may permit user equipment 110 to select TB1 1080 and TB2 1090 so that padding may be eliminated (or reduced) and so that RLC PDU 1020 may be contained within TB1 1080 and TB2 1090. As further shown in FIG. 10, TB1 1080 may fit MAC PDU1 1040 and TB2 1090 may fit MAC PDU2 1060 so that little or no padding may exist in TB2 1090.

Although FIG. 10 shows exemplary tasks associated with modified MAC segmentation mechanism 1000, in other embodiments, modified MAC segmentation mechanism 1000 may perform fewer, different, or additional tasks than depicted in FIG. 10.

Figure 11:
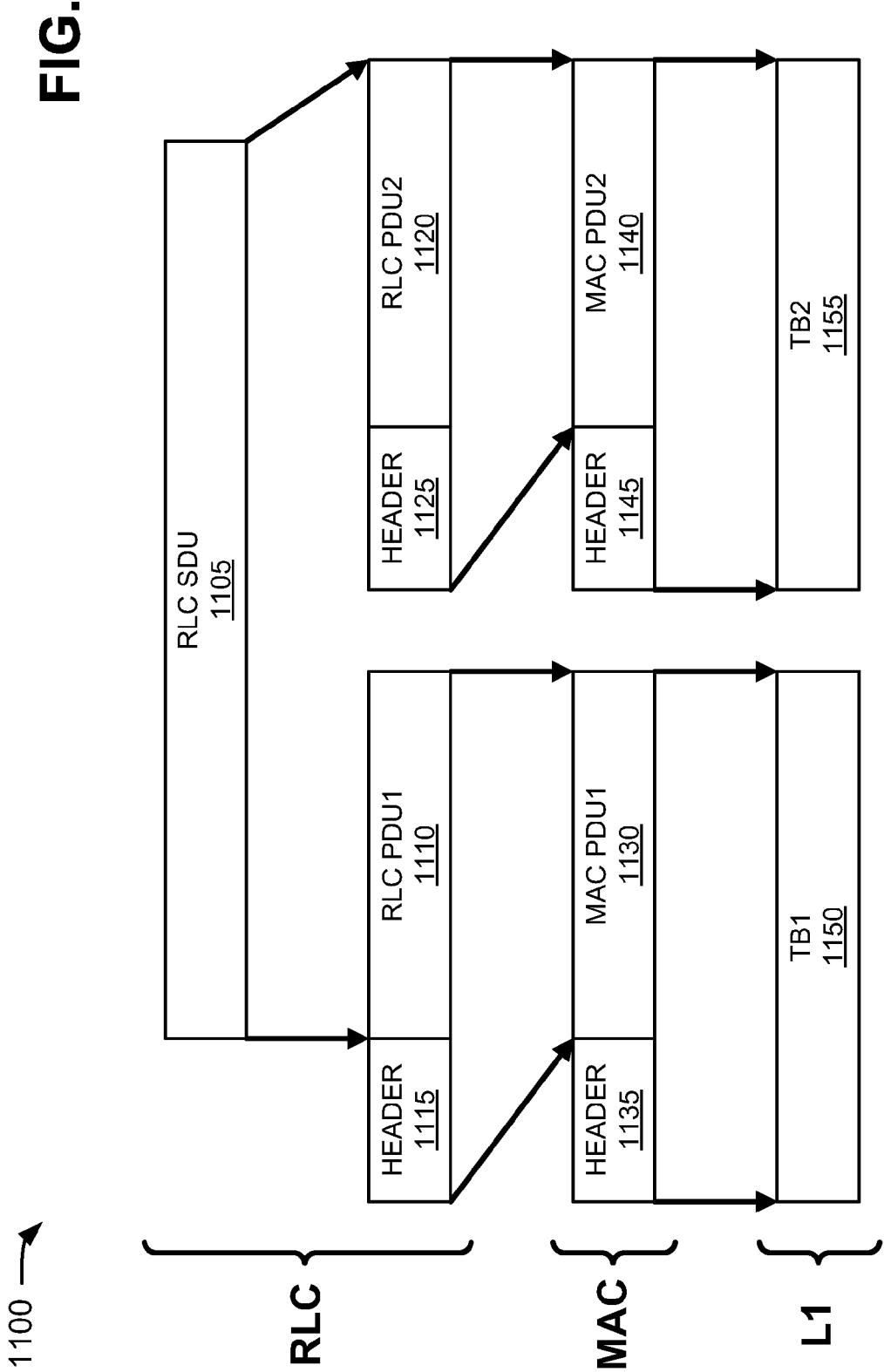
FIG. 11 illustrates a diagram of an exemplary modified radio-aware RLC segmentation mechanism capable of being deployed by the user equipment depicted in FIG. 1.

FIG. 11 illustrates a diagram of an exemplary modified radio-aware RLC segmentation mechanism 1100 (e.g., modified radio-aware RLC segmentation mechanism 770) capable of being deployed by user equipment 110. As shown, the RLC layer may include a RLC SDU 1105. At the RLC layer, modified radio-aware RLC segmentation mechanism 1000 may segment RLC SDU 1105 into a RLC PDU1 1110 (and a corresponding header 1115) and a RLC PDU2 1120 (and a corresponding header 1125). RLC SDU 1105 may include a set of data that a certain layer (e.g., the RLC layer) may pass to a layer below (e.g., the MAC layer). In one example, RLC SDU 1105 may be considered a "payload" of RLC PDU1 1110 and RLC PDU2 1120. RLC PDU1 1110 and RLC PDU2 1120 may include data that may be sent to a peer protocol layer (e.g., the MAC layer).

At the MAC layer, modified radio-aware RLC segmentation mechanism 1100 may associate RLC PDU1 110 and its header 1115 with a MAC PDU1 1130 (and a corresponding header 1135), and may associate RLC PDU2 1120 and its header 1125 with a MAC PDU2 1140 (and a corresponding header 1145). In one embodiment, MAC PDU1 1130 may be associated with a current transmission time interval (TTI) and MAC PDU2 1140 may be associated with a next TTI. At Layer 1 (L1), modified radio-aware RLC segmentation mechanism 1100 may associate MAC PDU1 1130 and its header 1135 with a first transport block (TB1) 1150, and may associate MAC PDU2 1140 and its header 1145 with a second transport block (TB2) 1155. Modified radio-aware RLC segmentation mechanism 1100 may permit user equipment 110 to select TB1 1150 and TB2 1155 so that padding may be eliminated (or reduced) and so that RLC SDU 1105 may be contained within TB1 1150 and TB2 1155. As further shown in FIG. 11, TB1 1150 may fit MAC PDU1 1130 and TB2 1155 may fit MAC PDU2 1140 so that little or no padding may exist in TB2 1155.

Although FIG. 11 shows exemplary tasks associated with modified radio-aware RLC segmentation mechanism 1100, in other embodiments, modified radio-aware RLC segmentation mechanism 1100 may perform fewer, different, or additional tasks than depicted in FIG. 11.

FIGS. 12-15 illustrate a flow chart of an exemplary process 1200 for minimizing padding associated with a RLC PDU or a RLC SDU during segmentation and ETFC selection according to embodiments described herein. In one embodiment, process 1200 may be performed by user equipment 110. In other embodiments, some or all of process 1200 may be performed by user equipment 110 in combination with another device or group of devices (e.g., communicating with user equipment 110).

Figure 12:
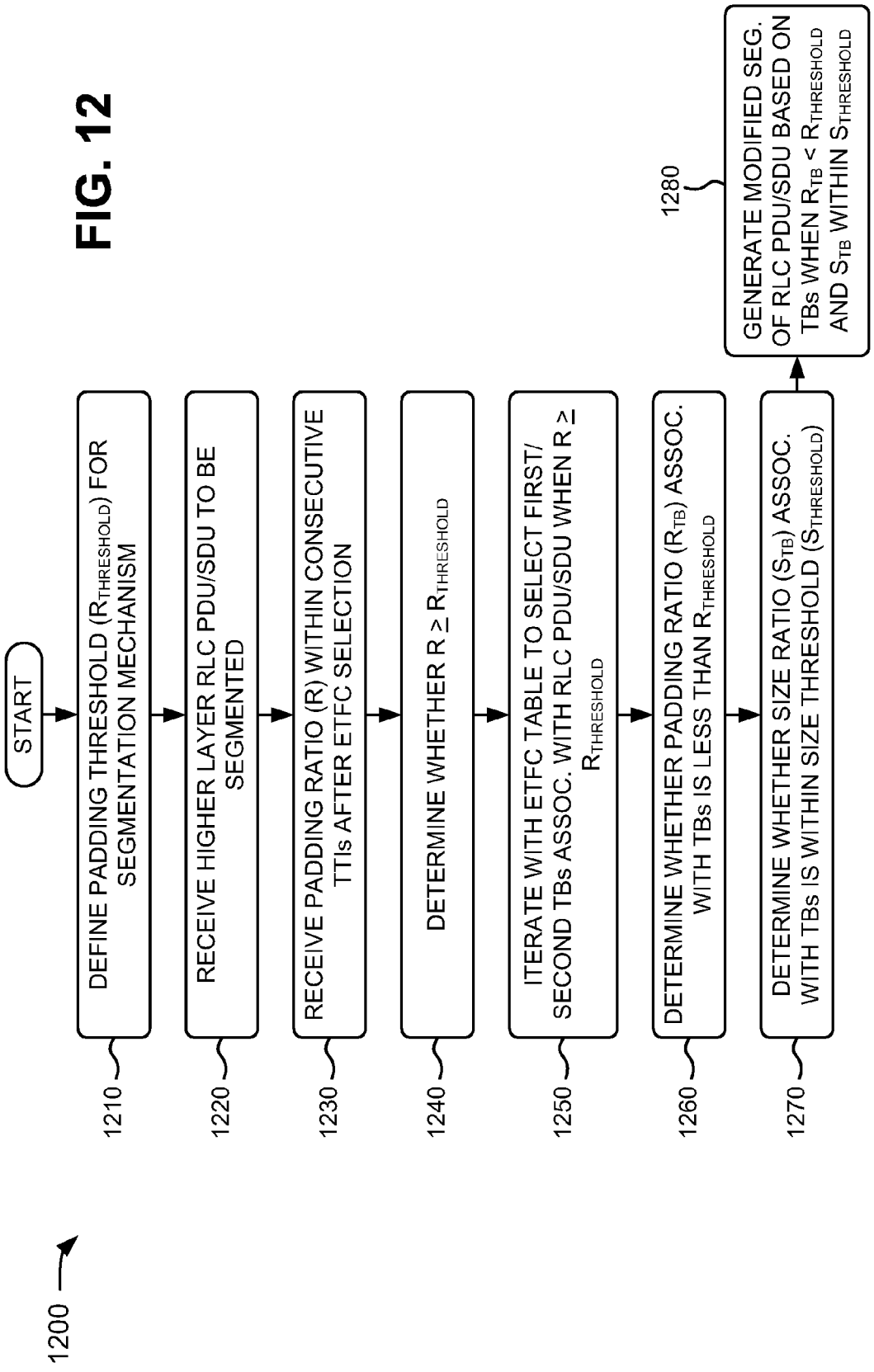
FIGS. 12-15 depict flow charts of an exemplary process according to embodiments described herein.

As illustrated in FIG. 12, process 1200 may include defining a padding threshold ($R_{THRESHOLD}$) for a segmentation mechanism (block 1210), receiving a higher layer RLC PDU or SDU to be segmented (block 1220), and receiving a padding ratio (R) within consecutive transmission time intervals (TTIs) after ETFC selection (block 1230). For example, in embodiments described above in connection with FIG. 8, user equipment 110 may include padding threshold definer 800, padding threshold comparer 810, and modified segmentation mechanism 830. Padding threshold definer 800 may define padding threshold ($R_{THRESHOLD}$) 840 for the MAC segmentation mechanisms and/or the radio-aware RLC segmentation mechanisms. Padding threshold comparer 810 may receive padding threshold 840 from padding threshold definer 800, may receive padding ratio (R) 850 associated with consecutive TTIs. Modified segmentation mechanism 830 may receive RLC PDU 740 or RLC SDU 760 to be segmented.

Returning to FIG. 12, it may be determined whether the padding ratio (R) is greater than or equal to the padding threshold ($R_{THRESHOLD}$) (block 1240), and iterations with an ETFC table may be performed to select first and second transport blocks associated with the RLC PDU or SDU when the padding ratio is greater than or equal to the padding threshold (block 1250). For example, in embodiments described above in connection with FIG. 9, user equipment 110 may include transport block selector 910. Transport block selector 910 may receive determination 870 that padding ratio 850 is greater than or equal to padding threshold 840, and may perform iterations 930 with ETFC table 900 if determination 870 is received. Transport block selector 910 may receive RLC PDU 740 or RLC SDU 760, and may receive current TTI 940 and next TTI 950 based on iterations 930. Transport block selector 910 may select two transport blocks (e.g., first transport block (TB) 960 and second transport block (TB) 970) that may contain RLC PDU 740 or RLC SDU 760 based on the received information.

As further shown in FIG. 12, it may be determined whether a padding ratio ($R_{TB}$) associated with the first and second transport blocks is less than the padding threshold (block 1260), it may be determined whether a size ratio ($S_{TB}$) associated with the first and second transport blocks is within a size threshold ($S_{THRESHOLD}$) (block 1270), and a modified segmentation of the RLC PDU or SDU may be generated based on the first and second transport blocks when the padding ratio ($R_{TB}$) is less than the padding threshold and the size ratio ($S_{TB}$) is within the size threshold ($S_{THRESHOLD}$) (block 1280). For example, in embodiments described above in connection with FIG. 9, user equipment 110 may include threshold determiner 920. Threshold determiner 920 may determine if a padding ratio ($R_{TB}$) associated with first and second transport blocks 960/970 is less than padding threshold 840, and may determine if a size ratio ($S_{TB}$) between first transport block 960 and second transport block 970 is within size threshold 980. If the padding ratio ($R_{TB}$) is less than padding threshold 840 and the size ratio ($S_{TB}$) is within size threshold 980, threshold determiner 920 may deploy a certain modified segmentation mechanism (e.g., modified MAC segmentation mechanism 750 or modified radio-aware RLC segmentation mechanism 770) based on whether RLC PDU 740 or RLC SDU 760 is received.

Figure 13:
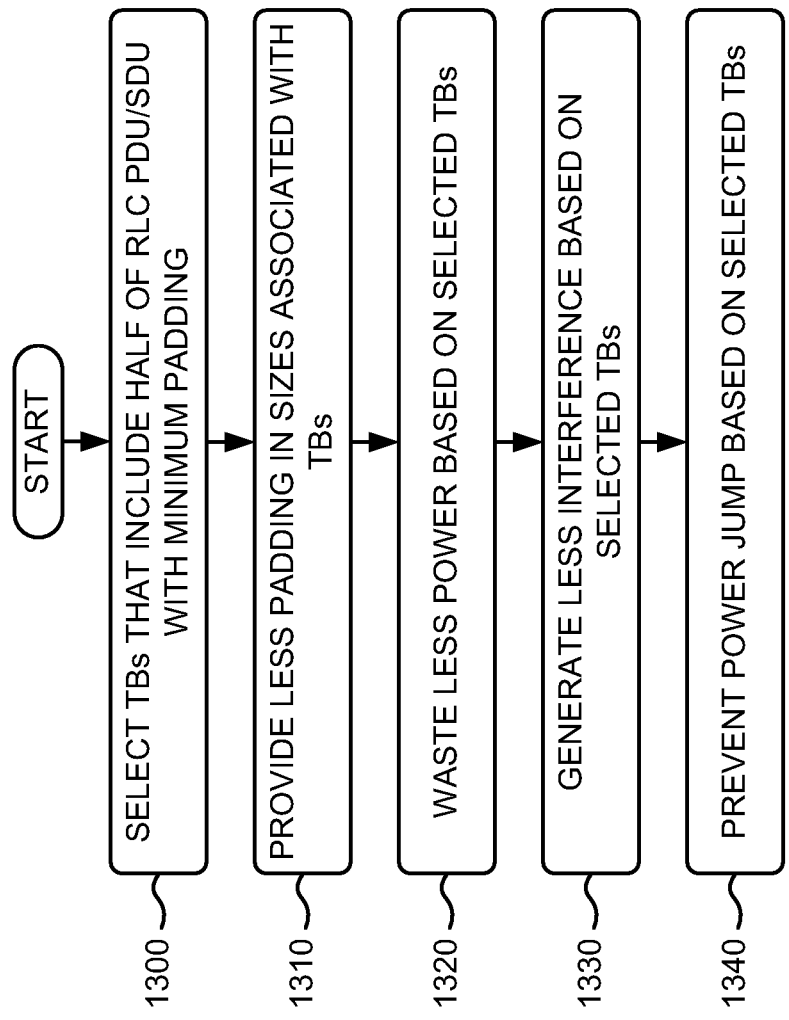

Process block 1250 may include the process blocks depicted in FIG. 13. As shown in FIG. 13, process block 1250 may include selecting the first and second transport blocks so that each includes half of the RLC PDU or SDU with minimum padding (block 1300), providing less padding in sizes associated with the first and second transport blocks (block 1310), wasting less power based on the selected first and second transport blocks (block 1320), generating less interference based on the selected first and second transport blocks (block 1330), and preventing power jump based on the selected first and second transport blocks (block 1340). For example, in embodiments described above in connection with FIG. 9, modified segmentation mechanism 830 may select a transport block that is sized to contain half of RLC PDU 740 (or RLC SDU 760), and may select another transport block that is sized to contain the other half of RLC PDU 740 (or RLC SDU 760). Modified segmentation mechanism 830 may also provide less padding in sizes associated with first transport block 960 and second transport block 970. Such an arrangement may ensure that padding is minimized and/or eliminated for RLC PDU 740 (or RLC SDU 760). Modified MAC segmentation mechanism 750 and modified radio-aware RLC segmentation mechanism 770 may prevent and/or reduce wasting of power, interference generation, and power jump in user equipment 110.

Figure 14:
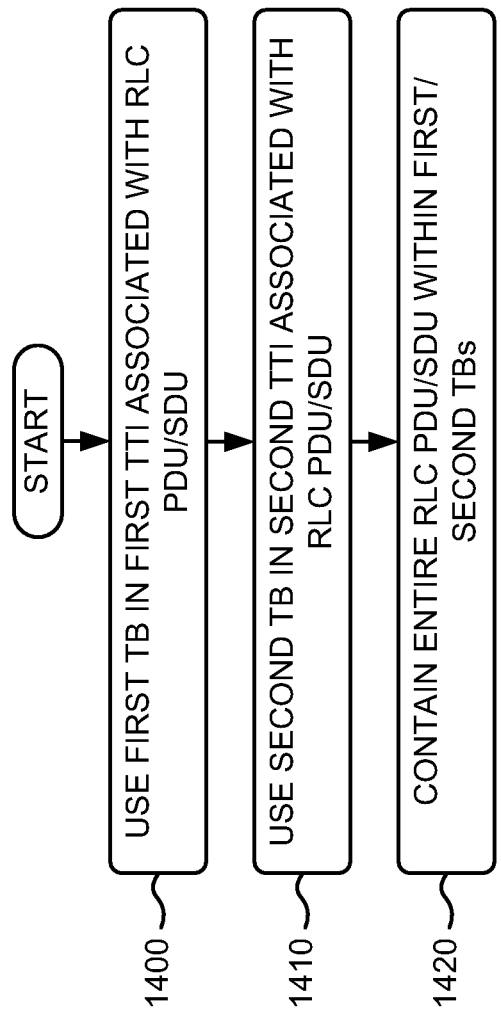

Alternatively and/or additionally, process block 1250 may include the process blocks depicted in FIG. 14. As shown in FIG. 14, process block 1250 may include using the first transport block in a first transmission time interval (TTI) associated with RLC PDU or SDU (block 1400), using the second transport block in a second TTI associated with RLC PDU or SDU (block 1410), and containing the entire RLC PDU or SDU within the first and second transport blocks (block 1420). For example, in embodiments described above in connection with FIG. 9, user equipment 110 may include transport block selector 910. Transport block selector 910 may receive RLC PDU 740 or RLC SDU 760, and may receive current TTI 940 and next TTI 950 based on iterations 930. Current TTI 940 and next TTI may be associated with RLC PDU 740 or RLC SDU 760. Transport block selector 910 may select two transport blocks (e.g., first transport block (TB) 960 and second transport block (TB) 970) that may contain RLC PDU 740 or RLC SDU 760 based on the received information. In one example, transport block selector 910 may select first transport block 960 for use in current TTI 940, and may select second transport block 970 for use in next TTI 950.

Figure 15:
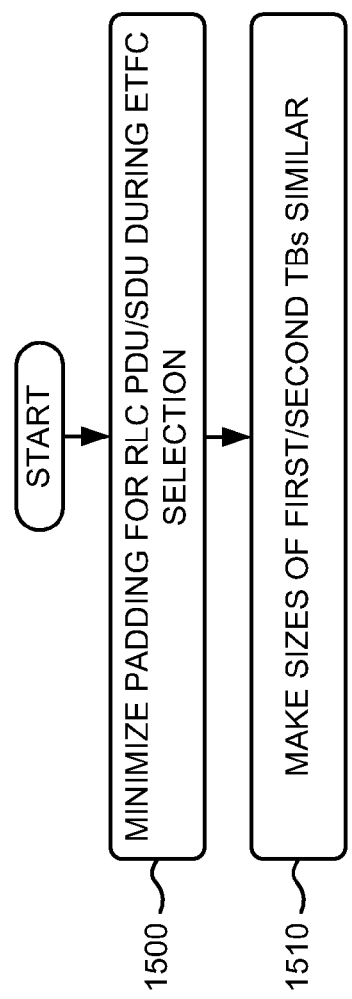

Process block 1280 may include the process blocks depicted in FIG. 15. As shown in FIG. 15, process block 1280 may include minimizing padding for the RLC PDU or SDU during ETFC selection (block 1500) and making the sizes of the first and second transport blocks similar (block 1510). For example, in embodiments described above in connection with FIG. 9, modified segmentation mechanism 830 may select a transport block that is sized to contain half of RLC PDU 740 (or RLC SDU 760), and may select another transport block that is sized to contain the other half of RLC PDU 740 (or RLC SDU 760). Such an arrangement may ensure that padding is minimized and/or eliminated for RLC PDU 740 (or RLC SDU 760) during ETFC selection.

Embodiments described herein may apply a modified MAC segmentation mechanism and/or a modified radio-aware RLC segmentation mechanism that minimize padding for a RLC PDU or SDU during ETFC selection. Such an arrangement may ensure that less padding is included in transport block sizes. This may prevent and/or reduce wasting of power and interference generation in the user equipment, and may improve performance of the user equipment. Furthermore, since such an arrangement may cause transport block sizes transmitted in two consecutive TTIs to be similar, power jump may be avoided in the user equipment.

Embodiments described herein provide illustration and description, but are not intended to be exhaustive or to limit the implementations to the precise form disclosed. Modifications and variations are possible in light of the above teachings, or may be acquired from practice of the implementations. For example, while a series of blocks has been described with regard to FIGS. 12-15, the order of the blocks may be modified in other embodiments. Further, non-dependent blocks may be performed in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the terms "comprises/comprising" when used in the this specification are taken to specify the presence of stated features, integers, steps, or components, but do not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising a processor and a memory, said memory containing instructions executable by said processor whereby said device is operative to implement a segmentation generator configured to receive a radio link control (RLC) protocol data unit (PDU) or service data unit (SDU) and to segment that RLC PDU or SDU for transmission in consecutive transmission time intervals (TTIs), the segmentation generator comprising:
   a padding threshold definer configured to define a padding threshold,
   a padding threshold comparer configured to determine whether a first padding ratio associated with the consecutive TTIs is greater than or equal to the padding threshold, wherein the first padding ratio is determined after enhanced dedicated channel (E-DCH) transport format combination (ETFC) selection, and
   a segmentation mechanism configured, when the first padding ratio is greater than or equal to the padding threshold, to segment the RLC PDU or SDU based on consideration for sizes of transport blocks and any padding associated with transmission of the RLC PDU or SDU in the consecutive TTIs, by iteratively:
      selecting different transport blocks associated with the RLC PDU or SDU,
      determining whether a second padding ratio associated with the selected transport blocks is less than the padding threshold,
      determining whether a size ratio associated with the selected transport blocks is within a size threshold, and
      segmenting the RLC PDU or SDU based on the selected transport blocks when the second padding ratio is less than the padding threshold and the size ratio is within the size threshold.

2. The device of claim 1, wherein the device comprises a user equipment (UE).

3. The device of claim 1, wherein the segmentation generator is configured to receive an RLC PDU and to segment that RLC PDU, and wherein the segmentation mechanism comprises a media access control (MAC) segmentation mechanism that is configured to segment the RLC PDU into different MAC PDUs.

4. The device of claim 1, wherein the segmentation generator is configured to receive an RLC SDU and to segment that RLC SDU, and wherein the segmentation mechanism comprises a radio-aware RLC segmentation mechanism that is configured to segment the RLC SDU into different RLC PDUs.

5. The device of claim 1, wherein the segmentation mechanism is configured to segment the RLC PDU or SDU based on consideration for minimizing padding associated with transmission of the RLC PDU or SDU in the consecutive TTIs.

6. The device of claim 1, wherein the segmentation mechanism is configured to select different transport blocks associated with the RLC PDU or SDU by:
   selecting a first transport block to include half of the RLC PDU or SDU, with minimum padding, and
   selecting a second transport block to include the other half of the RLC PDU or SDU, also with minimum padding.

7. The device of claim 1, wherein the segmentation mechanism is configured to segment the RLC PDU or SDU based on consideration for the size of transport blocks associated with transmission of the RLC PDU or SDU in order to prevent or reduce at least one of:
  wasting of power in the device,
  interference generation by the device, and
  power jump in the device.

8. The device of claim 1, wherein selecting different transport blocks associated with the RLC PDU or SDU comprises:
  selecting a first transport block for transmission of a segment of the RLC PDU or SDU in a first TTI,
  selecting a second transport block for transmission of a remaining segment of the RLC PDU or SDU in a second TTI, to thereby provide for transmission of the entire RLC PDU or SDU within the first and second transport blocks.

9. The device of claim 1, wherein selecting different transport blocks associated with the RLC PDU or SDU comprises selecting different transport blocks with substantially equal sizes.

10. The device of claim 1, further comprising another segmentation mechanism configured, when the first padding ratio is less than the padding threshold, to segment the RLC PDU or SDU based on consideration for maximizing the size of the segment of the RLC PDU or SDU to be transmitted within an earliest one of the consecutive TTIs.

11. The device of claim 10, wherein, if the segmentation generator is configured to receive an RLC PDU and to segment that RLC PDU, said another segmentation mechanism comprises a MAC segmentation mechanism, and otherwise if the segmentation generator is configured to receive an RLC SDU, said another segmentation mechanism comprises a radio-aware RLC segmentation mechanism.

12. A method implemented by a device associated with a wireless environment, the method comprising:
  receiving a data unit to be segmented for transmission in consecutive transmission time intervals (TTIs);
  defining a padding threshold;
  determining a first padding ratio associated with the consecutive TTIs; and,
  when the first padding ratio is greater than or equal to the padding threshold,
    segmenting the data unit based on consideration for sizes of transport blocks and any padding associated with transmission of the data unit in the consecutive TTIs, by iteratively:
    selecting different transport blocks associated with the data unit; and
    segmenting the data unit based on the selected transport blocks when a second padding ratio associated with the selected transport blocks is less than the padding threshold and a size ratio associated with the selected transport blocks is within a size threshold.

13. The method of claim 12, where the data unit comprises a radio link control (RLC) protocol data unit (PDU) or service data unit (SDU).

14. The method of claim 13, wherein the data unit comprises an RLC PDU, and wherein said segmenting comprises segmenting the RLC PDU into different media access control (MAC) PDUs.

15. The method of claim 13, wherein the data unit comprises an RLC SDU, and wherein said segmenting comprises segmenting the RLC SDU into different RLC PDUs.

16. The method of claim 12, wherein said segmenting is based on consideration for minimizing padding associated with transmission of the data unit in the consecutive TTIs.

17. The method of claim 12, wherein said selecting different transport blocks associated with the data unit comprises:
  selecting a first transport block to include half of the data unit, with minimum padding; and
  selecting a second transport block to include the other half of the data unit, also with minimum padding.

18. The method of claim 12, wherein said segmenting is based on consideration for preventing or reducing at least one of:
  wasting of power in the device,
  interference generation by the device, and
  power jump in the device.

19. The method of claim 12, wherein said selecting different transport blocks associated with the data unit comprises:
  selecting a first transport block for transmission of a segment of the data unit in a first TTI, and
  selecting a second transport block for transmission of a remaining segment of the data unit in a second TTI, to thereby provide for transmission of the entire data unit within the first and second transport blocks.

20. The method of claim 12, wherein selecting different transport blocks associated with data unit comprises selecting different transport blocks with substantially equal sizes.

21. The method of claim 12, further comprising, when the first padding ratio is less than the padding threshold, segmenting the data unit based on consideration for maximizing the size of the segment of the data unit to be transmitted within an earliest one of the consecutive TTIs.

22. A computer program product stored on a non-transitory computer readable medium and comprising computer program instructions that, when executed by a processing unit associated with a device, cause the device to segment a received radio link control (RLC) protocol data unit (PDU) or service data unit (SDU) for transmission in consecutive transmission time intervals (TTIs), the computer program instructions causing the device to:
  define a padding threshold for segmenting the RLC PDU or SDU,
  determine whether a first padding ratio associated with the consecutive TTIs is greater than or equal to the padding threshold, wherein the first padding ratio is determined after enhanced dedicated channel (E-DCH) transport format combination (ETFC) selection, and
  when the first padding ratio is greater than or equal to the padding threshold, segment the RLC PDU or SDU based on consideration for sizes of transport blocks and any padding associated with transmission of the RLC PDU or SDU in the consecutive TTIs, by iteratively:
    selecting different first and second transport blocks associated with the RLC PDU or SDU when the first padding ratio is greater than or equal to the padding threshold,
    determining whether a second padding ratio associated with the selected transport blocks is less than the padding threshold,
    determining whether a size ratio associated with the selected transport blocks is within a size threshold, and
    generate a modified segmentation of the RLC PDU or SDU based on the selected transport blocks when the second padding ratio associated with the first and second transport blocks is less than the padding threshold and the size ratio associated with the first and second transport blocks is within the size threshold.

* * * * *

UNITED STATES PATENT AND TRADEMARK OFFICE
CERTIFICATE OF CORRECTION

| | | |
|---|---|---|
| PATENT NO. | : 8,964,639 B2 | Page 1 of 1 |
| APPLICATION NO. | : 13/130646 | |
| DATED | : February 24, 2015 | |
| INVENTOR(S) | : Fan et al. | |

It is certified that error appears in the above-identified patent and that said Letters Patent is hereby corrected as shown below:

In the specification

In Column 10, Lines 17-18, delete "mechanism 830." and insert -- mechanism 820. --, therefor.

Signed and Sealed this

Thirteenth Day of October, 2015

Michelle K. Lee
*Director of the United States Patent and Trademark Office*